United States Patent
Hamabe

[11] Patent Number: 5,396,649
[45] Date of Patent: Mar. 7, 1995

[54] CHANNEL ASSIGNMENT METHOD IN A MOBILE COMMUNICATION SYSTEM USING CHANNEL SELECTION ORDER DETERMINED BY TRANSMISSION POWER LEVEL

[75] Inventor: Kojiro Hamabe, Tokyo, Japan

[73] Assignee: NEC Corporation, Tokyo, Japan

[21] Appl. No.: 87,890

[22] Filed: Jul. 9, 1993

[30] Foreign Application Priority Data

Jul. 9, 1992 [JP] Japan .................................. 4-181404

[51] Int. Cl.⁶ .............................................. H04B 7/00
[52] U.S. Cl. .................................. 455/34.1; 455/54.1; 455/62
[58] Field of Search ............... 455/33.1, 33.4, 34.1, 455/54.1, 62, 63, 67.1; 379/61

[56] References Cited

U.S. PATENT DOCUMENTS

| | | | |
|---|---|---|---|
| 4,672,657 | 6/1987 | Dershowitz | 455/34.1 |
| 5,023,932 | 6/1991 | Wakana | 379/61 |
| 5,050,234 | 9/1991 | Ohteru | 455/62 |
| 5,203,012 | 4/1993 | Patsiokas et al. | 455/62 |
| 5,293,641 | 3/1994 | Kallin et al. | 455/34.1 |

FOREIGN PATENT DOCUMENTS

| | | |
|---|---|---|
| 0202485 | 11/1986 | European Pat. Off. . |
| 0411878 | 2/1991 | European Pat. Off. . |
| 0441372 | 8/1991 | European Pat. Off. . |

*Primary Examiner*—Curtis Kunt
*Assistant Examiner*—Andrew Faile
*Attorney, Agent, or Firm*—Sughrue, Mion, Zinn, Macpeak & Seas

[57] ABSTRACT

A communication channel assignment method is disclosed in a cellular mobile communication system in which, instead of assigning communication channels in a fixed manner in each cell, whenever there is a demand for assignment of a communication channel to be used between a base station and a mobile station, channels are assigned by merely measuring the ratio of the desired signal to the interference signal at these two stations without checking interference in nearby cells and, if there is surplus in the reception level, transmission power can be lowered. In this communication channel assignment method, channels are selected in a particular order or its reverse that is identically established for all cells depending on whether the transmission power is less than or greater than a specified value.

2 Claims, 3 Drawing Sheets

CHANNEL ASSIGNMENT METHOD IN A MOBILE COMMUNICATION SYSTEM USING CHANNEL SELECTION ORDER DETERMINED BY TRANSMISSION POWER LEVEL

BACKGROUND OF THE INVENTION

1. Field of the Invention

The present invention relates to channel assignment method in a cellular mobile communication system.

2. Description of the Prior Art

In a mobile communication system such as a cordless telephone system, the base station is not assigned communication channels in a fixed manner, but rather, with each demand for communication, the base station performs dynamic channel assignment in which the interference signal level is checked and a channel determined to be idle (i.e., the channel is not busy in that cell and nearby cells) is chosen and used. In this assignment, there is a channel assignment method by which assignment is made without measuring the power ratio of the desired signal to the interference signal (hereinafter referred to as Carrier to Interference Ratio [CIR]) between the neighboring cells' base station and mobile station that are already using the channel to be assigned.

In this type of channel assignment method, control is often exercised over the transmission power with the purpose of effective frequency use and decreased power consumption at terminals. The transmission power control systems can be broadly divided between two systems. In one, within the range in which the received power of the desired signal is at or above a fixed value, control is exercised to limit the transmission power to the lowest possible level. This system will here be referred to as the desired signal level system. In the other system, within the range in which the received power of the desired signal is at or above a fixed value, and moreover, the CIR is at or above a required value, control is exercised to limit the transmission power to the lowest possible level. This system will here be referred to as the CIR system.

In this type of system that performs dynamic channel assignment and transmission power control, a communication using a channel judged to be idle may cause interference to communications in other cells. Particularly, when the number of cells of large transmission power is at the same level as cells with small transmission power, the probability for interference to occur (hereinafter referred to as interference probability) becomes great. The reason for this will be explained below. First, the case must be considered in which, at a particular transmission power and while a particular channel is in use, the same channel is assigned to a cell in the vicinity at the same or less transmission power. At such a time, the interference signal level at the base station and mobile station using the same channel will frequently be at the same level or less than the interference signal level of the base station and mobile station to be newly assigned. Consequently, if the CIR in a newly assigned base station and mobile station is at or above the required value, the probability that the CIR in the already busy base station and mobile station will be at or above the required value is relatively high, and the probability of interference is small.

In contrast, in a case in which the same channel is assigned at a larger transmission power, the interference signal level for the busy base station and mobile station will more commonly be greater than the interference signal level of the newly assigned base station and mobile station, and consequently, even if the CIR for the newly assigned base station and mobile station is at or above the required value, the CIR of the in use base station and mobile station will be at or below the required value and interference is likely to occur. Accordingly, when cells of large transmission power and cells of small transmission power are mixed at approximately the same proportion, even though a particular channel is in use nearby at a low transmission power, the same channel may be assigned at a large transmission power and the probability of interference is potentially great.

When interference occurs during a communication, it becomes necessary to switch the channel during the communication. When the incidence of channel switching during communication increases, not only is there a problem with increasing burden on control, there is also the problem of a greater probability for forced disconnection resulting from switching when there are no idle channels. It is therefore necessary to limit the probability of the occurrence of interference.

In a case in which control of transmission power is not carried out by the base station and is performed only by the mobile station by the desired signal level system, by measuring the CIR of the base station and mobile station to be newly assigned, the CIR in other stations using the channel to be assigned is estimated and the occurrence of interference can be prevented. This channel assignment method is explained in the following reference:

Syuji YASUDA and Seizo ONOE, "Mobile Station Transmission Power Control for Dynamic Channel Assignment in Mobile Radio Systems." The Institute of Electronics, Information and Communication Engineers. Spring National Conference. 1991. B-333

Nevertheless, the above-described methods do not take into consideration cases in which, in a mobile communication system in which a channel is assigned without estimating the CIR for a base station and mobile station in a cell in the vicinity that is already using the channel to be assigned, transmission power control is performed at both the base station and the mobile station or transmission power control is performed by the CIR system.

SUMMARY OF THE INVENTION

The object of the present invention is to provide a mobile communication system channel assignment method that can reduce the interference probability in cases in which transmission power control is performed at both the base station and mobile station, and moreover, in cases in which the transmission power control is performed by the desired signal level system and the CIR system.

In particular, the object of the first invention is to provide a channel assignment method for cases in which transmission power control is performed by a desired signal level system, and the object of the second invention is to provide a channel assignment system for cases in which transmission power control is performed by a CIR system.

When a station using a channel at a large transmission power and a station using a channel at a small transmission power are using the same channel, interference can easily occur. According to the first invention, the transmission power is decided from the desired signal level, and channels are alternately selected in reverse order for times when that transmission power is great and when transmission power is small. Accordingly, the interference probability is lessened because there is less likelihood for the same channel to be used by both a cell using channels at great transmission power and a cell using channels at a small transmission power.

According to the second invention, the transmission power cannot be determined by the desired signal level alone, but because channels that can be used are selected in order from small transmission power, CIR-type transmission power control can be realized whereby channels are assigned at the minimum transmission power to satisfy the required CIR. Because the order of selecting channels that can be used at a great transmission power and the order of selecting channels that can be used at a small transmission power alternately reverse, there is less chance that cells using a channel at a great transmission power and cells using channels at a small transmission power will use the same channel, and thereby, interference probability is decreased.

In order to achieve the above-described objects, there is provided a channel assignment method in a mobile communication system when assignment is required of a communication channel to be used between a base station and a mobile station, said method comprising the steps of:

selecting a transmission power level at which the reception level of a transmission signal from said mobile station is at or above a specified value a;

selecting communication channels in an order previously and identically established for all base stations when said transmission power level is at or below a specified value b, and selecting communication channels in an order opposite said order when said transmission power level exceeds said value b;

estimating the interference signal level in the selected said communication channel at said base station and said mobile station; and assigning a first communication channel at which the ratio of the reception level of the transmission signal in said transmission power level to said interference signal level is at or above a specified value c at both said base station and said mobile station.

And further, instead of selecting a transmission power level at which the reception level of transmission signal is at or above a specified value, selecting transmission power level in sequential steps from a minimum transmission power level at which the reception level of the transmission signal from said mobile station is at or above a specified value a up to a maximum transmission power level; and selecting communication channels in each transmission power level in the order of said sequential steps from said minimum transmission power level.

DETAILED DESCRIPTION OF THE PREFERRED EMBODIMENTS

Explanation will next be given regarding an embodiment of the present invention with reference to figures.

Figure 3:
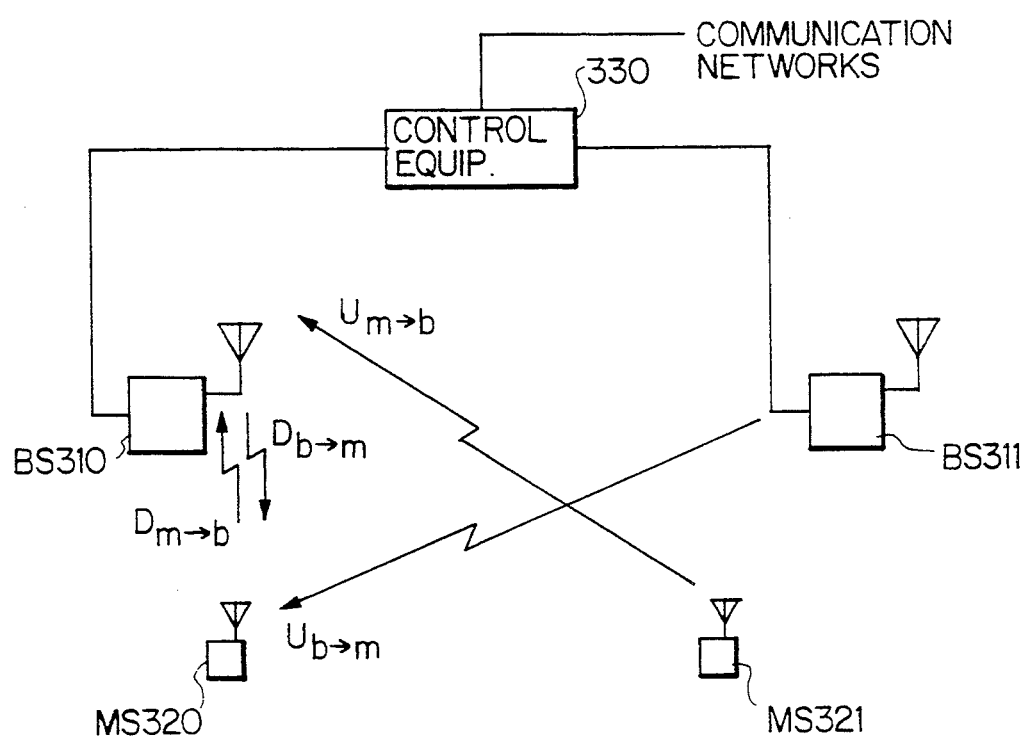
FIG. 3 shows the interference model for the space between two cells in a cellular mobile communication system.

FIG. 3 is a diagram showing an interference model for the space between two cells in a cellular mobile communication system.

The diagram shows the pattern of interference caused in a communication channel used between a base station BS310 and mobile station MS320 in one cell by the same channel used between a base station BS311 and a mobile station MS321 in another nearby cell. $D_{m \to b}$ indicates the signal level of a communication channel transmitted by MS320 and received at BS310 as the desired signal. $U_{m \to b}$ indicates the signal level of a communication channel transmitted from MS321 toward BS311 in another cell that is received at BS310 as an interference signal. In the same manner, $D_{b \to m}$ and $U_{b \to m}$ indicate the desired signal level and the interference signal level at MS320.

The transmission power is determined by changing the control amount with each request for communication. Here, control for one step, specifically, the case for control amount 0 or a fixed value A, will be explained as an example. If the transmission power is P when the control amount is 0, the transmission power will be P-A when the control amount is A.

Figure 1:
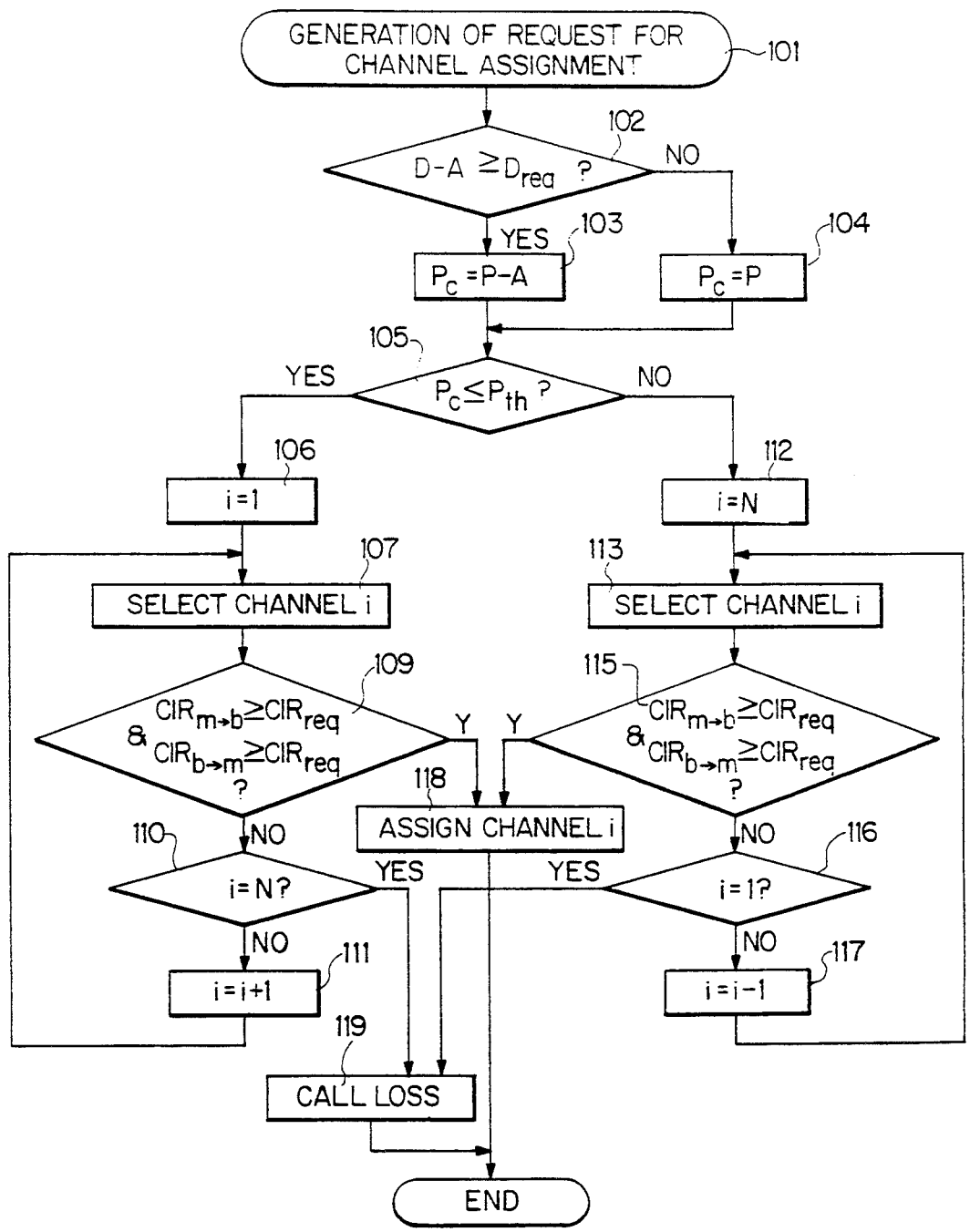
FIG. 1 shows the channel assignment algorithm that is one embodiment of the mobile communication system channel assignment method of the first invention.

FIG. 1 is a diagram showing the channel assignment algorithm that is one embodiment of the channel assignment method of the first invention.

When a request is generated for channel assignment between BS310 and MS320 (Step 101), BS310 measures the reception level D of the control channel transmitted by MS320, and if the difference between this level D and the control amount A is at or above a required reception level $D_{req}$, the transmission power $P_c$ of the communication channel between BS310 and MS320 is made (P-A), and in other cases the transmission power $P_c$ is made P (Steps 102, 103, 104). When this transmission power $P_c$ is at or below a specified value $P_{th}$ that determines the order of channel selection, the initial value of the channel selection parameter i is made 1, and when $P_c$ is greater than the value $P_{th}$, the initial value of parameter i is the aggregate number N of all communication channels (Steps 105, 106, 112). The specified value $P_{th}$ used here is a value between (P-A) and P.

When $P_c \leq P_{th}$ and the initial value of parameter i is 1, communication channels i are then selected in the order 1, 2, 3, ... (Step 107), BS310 measures interference signal level $U_{m \to b}$ and MS320 measures interference signal level $U_{b \to m}$, and if both of the desired signal to interference signal power ratios at BS310 and MS320 under transmission power control $CIR_{m \to b} [=D-(P-P_c)-U_{m \to b}]$ and $CIR_{b \to m} [=D-(P-P_c)-U_{b \to m}]$ are at or above the required value $CIR_{req}$ (Step 109), that communication channel is assigned and used (Step 118). If either of the power ratios $CIR_{m \to b}$ and $CIR_{b \to m}$ is below the required value in Step 109, parameter i is increased by 1 and the process is repeated from Step 107 until before all channels are selected, i.e., until before i=N. After all channels are selected, that is, when i=N, the channel assignment is unsuccessful (Step 119).

When $P_c > P_{th}$ and the initial value of parameter i is N, communication channels i are then selected in the order N, N−1, N−2, ... (Step 113), BS310 measures interference signal level $U_{m \to b}$ and MS320 measures interference signal level $U_{b \to m}$, and if both of the desired signal to interference signal power ratios at BS310 and MS320 under transmission power control $$CIR_{m \to b} \ [= D - (P - P_c) - U_{m \to b}] \text{ and}$$

$$CIR_{b \to m} \ [= D - (P - P_c) - U_{b \to m}]$$

are at or above the required value $CIR_{req}$ (Step 115), that communication channel is assigned and used (Step 118). If either of the desired signal to interference signal power ratios $CIR_{m \to b}$ and $CIR_{b \to m}$ is below the required value in Step 115, parameter i is decreased by 1 and the process is repeated from Step 113 until before all channels are selected, i.e., until before i=1. After all channels are selected, that is, when i=1, the channel assignment is unsuccessful (Step 119).

Figure 2:
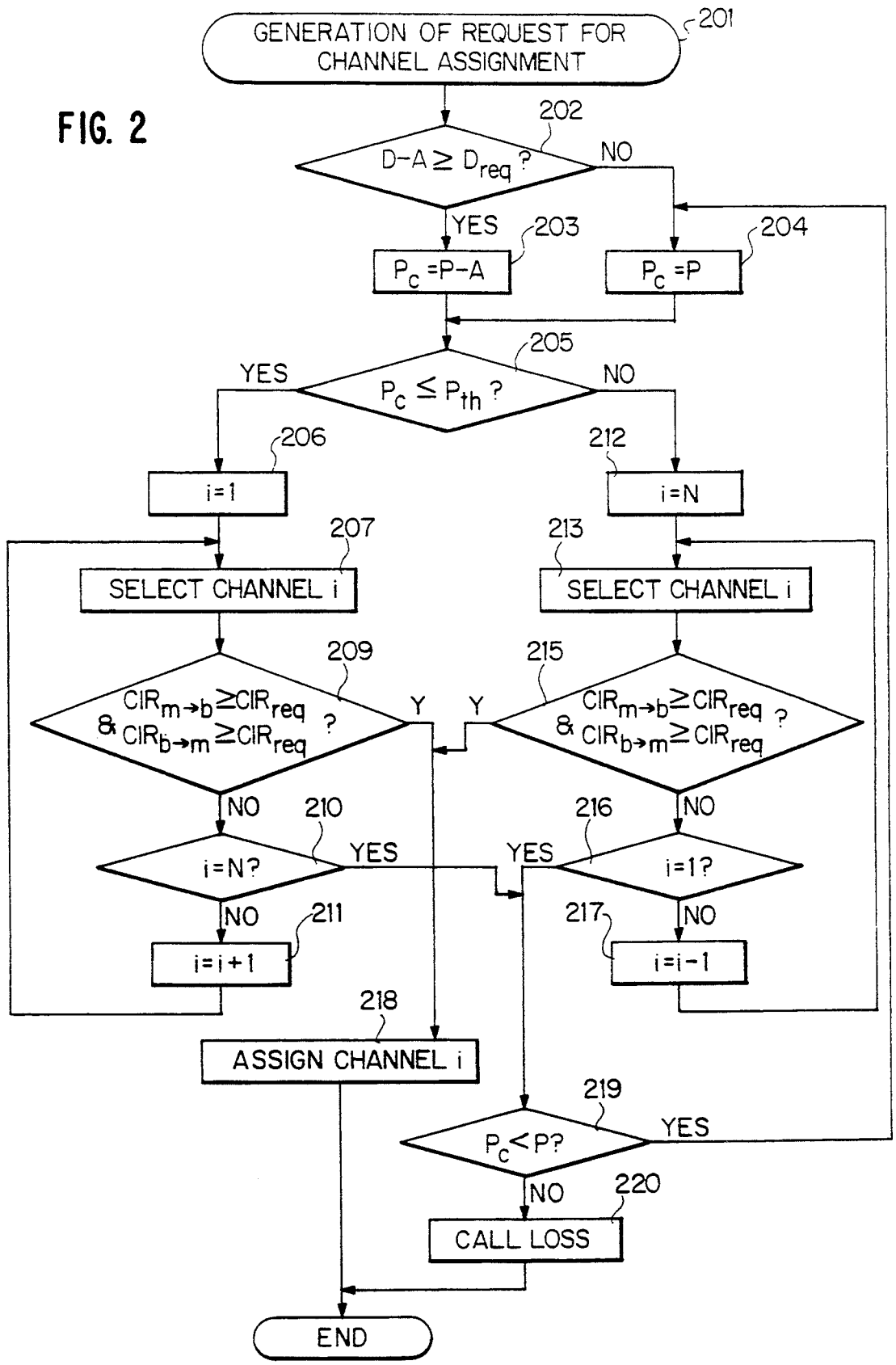
FIG. 2 shows the channel assignment algorithm that is one embodiment of the mobile communication system channel assignment method of the second invention.

FIG. 2 is a diagram showing the channel assignment algorithm that is one embodiment of the channel assignment method of the second invention.

When a request is generated for channel assignment between BS310 and MS320 (Step 201), BS310 measures the desired signal level D, and if the difference between this level D and the control amount A is at or above a required reception level $D_{req}$, the transmission power $P_c$ is made P−A, and when it is otherwise, the transmission power $P_c$ is made P (Steps 202, 203, 204). When this transmission power $P_c$ is at or below a specified value $P_{th}$ that determines the order of channel selection, the initial value of the channel selection parameter i is made 1, and in cases when $P_c$ is greater than the value $P_{th}$, the initial value of parameter i is the aggregate number N of all communication channels (Steps 205, 206, 212). The specified value $P_{th}$ used here is a value between P−A and P.

When $P_c \leq P_{th}$ and the initial value of parameter i is 1, communication channels i are then selected in the order 1, 2, 3, ... (Step 207), BS310 measures interference signal level $U_{m \to b}$ and MS320 measures interference signal level $U_{b \to m}$, and if both of the desired signal to interference signal power ratios at BS310 and MS320 under transmission power control $$CIR_{m \to b} \ [= D - (P - P_c) - U_{m \to b}] \text{ and}$$

$$CIR_{b \to m} \ [= D - (P - P_c) - U_{b \to m}]$$

are at or above the required value $CIR_{req}$ (Step 209), that communication channel is assigned and used (Step 218). If either of the desired signal to interference signal power ratios $CIR_{m \to b}$ and $CIR_{b \to m}$ is below the required value in Step 209, parameter i is increased by 1 and the process is repeated from Step 207 until before all channels are selected, i.e., until before i=N.

When $P_c > P_{th}$ and the initial value of parameter i is N, communication channels i are then selected in the order N, N−1, N−2, ... (Step 213), BS310 measures interference signal level $U_{m \to b}$ and MS320 measures interference signal level $U_{b \to m}$, and if both of the desired signal to interference signal power ratios at BS310 and MS320 under transmission power control $$CIR_{m \to b} \ [= D - (P - P_c) - U_{m \to b}] \text{ and}$$

$$CIR_{b \to m} \ [= D - (P - P_c) - U_{b \to m}]$$

are at or above the required value $CIR_{req}$ (Step 215), that communication channel is assigned and used (Step 218). If either of the desired signal to interference signal power ratios $CIR_{m \to b}$ and $CIR_{b \to m}$ is below the required value in Step 215, parameter i is decreased by 1 and the process is repeated from Step 213 until before all channels are selected, i.e., until before i=1.

After all channels are selected, that is when i=N in step 210 or when i=1 in step 216, if the transmission power $P_c$ is below P (Step 219), $P_c$ is used as P (Step 204) and the same process is repeated from that point on. If transmission power $P_c$ is not below P, the channel assignment is unsuccessful (Step 220).

While preferred embodiments have been described in detail above, it is to be understood that the present invention is not limited to these embodiments. For example, in the embodiments the control amount for transmission power control of the base station and the mobile station is made the same and channels are selected and assigned in batches from the base station to the mobile station and from the mobile station to the base station, but there is no hindrance to operating the invention such that the transmission power of the base station and mobile station is independently controlled, for example, by carrying out channel selection based on the larger transmission power, or by independently carrying out selection of a channel from the base station to a mobile station and a channel from a mobile station to a base station.

What is claimed is:

1. A channel assignment method in a mobile communication system when assignment is required of a communication channel to be used between a base station and a mobile station, said method channel assignment method comprising the steps of:
   selecting a transmission power level at which the reception level of a transmission signal from said mobile station is at least a specified value a;
   selecting communication channels in a first order previously and identically established for all base stations when said transmission power level is at most a specified value b, and selecting communication channels in a second order opposite said first order when said transmission power level exceeds said specified value b;
   estimating an interference signal level in a selected communication channel at said base station and at said mobile station; and
   assigning a first communication channel at which the ratio of the reception level of the transmission signal in said transmission power level to said interference signal level is at least a specified value c at both said base station and said mobile station.

2. A channel method as claimed in claim 1, wherein said selecting step comprises the step of selecting said transmission power level in sequential steps from a minimum transmission power level at which the reception level of the transmission signal from said mobile station is at least said specified value a up to a maximum transmission power level; and wherein said step of selecting communication channels comprises the step of selecting communication channels in each transmission power level in the order of said sequential steps from said minimum transmission power level.

* * * * *